United States Patent [19]
Tapscott

[11] Patent Number: 6,031,011
[45] Date of Patent: Feb. 29, 2000

[54] TROPODEGRADABLE BROMINE-CONTAINING HALOCARBONS AS FOAM BLOWING AGENTS

[75] Inventor: Robert E. Tapscott, Albuquerque, N.Mex.

[73] Assignee: University of New Mexico, Albuquerque, N.Mex.

[21] Appl. No.: 09/104,861

[22] Filed: Jun. 25, 1998

Related U.S. Application Data

[60] Provisional application No. 60/050,778, Jun. 25, 1997.

[51] Int. Cl.⁷ .............................. C08J 9/00; C08G 18/00
[52] U.S. Cl. .............................................. 521/98; 521/131
[58] Field of Search ........................................ 521/98, 131

[56] References Cited

U.S. PATENT DOCUMENTS

| | | | |
|---|---|---|---|
| 4,581,384 | 4/1986 | Marion | 521/131 |
| 5,137,929 | 8/1992 | Demmin et al. | |
| 5,395,859 | 3/1995 | Demmin et al. | 521/131 |
| 5,444,102 | 8/1995 | Nimitz | 521/131 |
| 5,589,519 | 12/1996 | Knaus | 521/79 |

OTHER PUBLICATIONS

R.W. Farmer et al: "Control Technology . . . Foam Manufacturing"; Jan. 1988; p. 2.
K.P. Wert et al; "Control Technology . . . Foam Manufacturing" Jan. 1988; p. 2.
J.R. Ebdon et al; "Flame Retardance. . .Groups"; pp. 1–9.
Soloman et al; Time–dependent. . . forcasts: May 1992.

*Primary Examiner*—Morton Foelak
*Attorney, Agent, or Firm*—Robert W. Becker & Associates

[57] ABSTRACT

A set of tropodegradable bromine-containing hydrocarbon foam-blowing agents to (1) decrease the flammability of closed-cell foams and (2) to decrease flammability safety problems that may occur during foam production is disclosed. The agents are characterized by high flammability reduction efficiency and short atmospheric lifetimes. The latter property is essential and results in a low ozone depletion potential (ODP) and a low global warming potential (GWP). The agents are bromine-containing alkenes, bromine-containing ethers, bromine-containing amines, bromine-containing carbonyl compounds, bromine-containing aromatics, bromine-containing alcohols, and/or bromine-containing non-fluorinated alkanes.

6 Claims, No Drawings

TROPODEGRADABLE BROMINE-CONTAINING HALOCARBONS AS FOAM BLOWING AGENTS

This application claims benefit of provisional application Ser. No. 60/050,778 filed Jun. 25, 1997.

FIELD OF THE INVENTION

The invention described and claimed herein is generally related to bromine-containing halocarbon compounds to be used as blowing agents (also called "agents" herein) for polymer foams. Specific and novel to this invention are the combined properties of these agents: (1) The halocarbons claimed are destroyed or otherwise removed rapidly by natural processes in the earth's troposphere and thus have short atmospheric lifetimes, low ozone depletion potentials (ODPs), and low global warming potentials (GWPs). (2) These agents are chemically active flammability suppressants that can decrease the flammability of closed-cell polymer foams and avoid flammability problems during production of both closed-cell and open-cell foams. Unlike the chlorofluorocarbons (CFCs), hydrochlorofluorocarbons (HCFCs), perfluorocarbons (PFCs), and hydrofluorocarbons (HFCs) used in the past, now being used, or being considered for use as blowing agents, these compounds actually decrease the flammability of blown foams by chemical mechanisms rather than by heat absorption. I refer herein to atmospheric lifetimes, ODPs, and GWPs as "global environmental properties" since they determine the potential environmental impact on the earth as a whole rather than just one area. The foam blowing agents claimed are called "tropodegradable" since they are removed rapidly from the earth's troposphere.

BACKGROUND

Halocarbons

The broad class of halocarbons consists of all molecules containing carbon and one or more of the following halogen atoms: fluorine, chlorine, bromine, and/or iodine. Halocarbons, as the term is used here, may also contain other chemical features such as hydrogen, oxygen, and/or nitrogen atoms; carbon-to-carbon multiple bonds; and aromatic rings.

Due to their generally low toxicities and low or non-existent flammability, one family of halocarbons—the chlorofluorocarbons (CFCs), which contain only carbon, chlorine, and fluorine atoms—has been used for many years as foam blowing agents. Methyl chloroform, $CH_3CCl_3$, has also been widely used.

Foam Blowing Agents

The manufacture of polymer foams for insulation, cushioning, packaging and other uses requires gas or volatile liquid blowing agents to create bubbles or cells. There are two types of polymer foams-open-cell and closed cell. Open-cell foams, sometimes called flexible foams, are used almost solely for cushioning since their open-cell structure allows gases to escape and re-enter the foam, providing flexibility. Thus, blowing agents are released almost immediately following production of open-cell foams (Farmer, R. W., and Nelson, T. P., *Control Technology Overview Report: CFC-11 Emissions From Flexible Polyurethane Foam Manufacturing*, EPA-600/2-88-004, U.S. Environmental Protection Agency, Research Triangle Park, N.C., Radian Corporation, Austin, Tex., January 1988). Closed-cell foams, on the other hand, have closed cells to provide rigidity. For many closed-cell foams, release of trapped gases is very slow and can be hundreds of years (Wert, K. P., Nelson, T. P., and Quass, J. D., *Control Technology Overview Report: CFC Emissions from Rigid Foam Manufacturing*, EPA-600/2-88-003, Environmental Protection Agency, Research Triangle Park, N.C., Radian Corporation, Austin, Tex., Jan. 1988). Closed-cell foams have a variety of uses, but are widely used as insulating materials.

CFC-11 (trichlorofluoromethane, $CCl_3F$), CFC-12 (dichlorodifluoromethane, $CCl_2F_2$), CFC-113 (1,1,2-trichloro-1,2,2-trifluoroethane, $CCl_2FCClF_2$), CFC-114 (1,2-dichloro-1,1,2,2-tetrafluoroethane, $CClF_2CClF_2$), methyl chloroform, and mixtures of these chemicals are the most common materials that have been used in the past as blowing agents in the manufacture of polymer foam products. In addition to their remarkably low toxicities and lack of flammability, these materials provide closed-cell foams with excellent insulating ability and generally have good materials compatibility. The blowing agents may be used in a number of ways. For example, they may be mixed with the reactants forming a polymer and vaporized by the heat of reaction during polymerization to give a foam, as is normally the case with polyurethane foams. They may be injected into molten plastics under pressure and form foams upon expansion, as is done for extruded polystyrene. The blowing agents may also be incorporated into plastic beads, which expand upon heating, as in expandable polystyrene. Any other method permitting volatilization of the blowing agents to expand a polymer would also be suitable.

Global Environmental Problems

CFCs, and many other halocarbons, have come to be recognized as serious global environmental threats due to their ability to cause stratospheric ozone depletion and global warming and their significant atmospheric lifetime. The ozone depletion and global warming impact of chemicals such as these is measured by the ozone depletion potential (ODP) and global warming potential (GWP). ODP and GWP give the relative ability of a chemical to deplete stratospheric ozone or to cause global warming on a per-pound-released basis. ODP and GWP are usually calculated relative to a reference compound (usually CFC-11 for ODP and either CFC-11 or carbon dioxide for GWP) and are usually calculated based on a release at the earth's surface. It is important to note that ODP and GWP values must be calculated by computer models; they cannot be measured. As models, theory, and input parameters change, the calculated values vary. For that reason, many different values of ODP and GWP are often found in the literature for the same compound. Nevertheless, the calculation results are very accurate in predicting which compounds are highly detrimental to ozone depletion or global warming, which are only moderately detrimental, and which have very low or essentially zero impacts.

Despite the wide utility of CFCs, their production has been severely restricted due to concerns about stratospheric ozone depletion. In fact, under the Montreal Protocol, an international treaty enacted in 1987 and amended in 1990, 1992, and 1995, the production of CFCs was phased out in all industrialized nations at the end of 1995. Moreover, the production of certain other halocarbon chemicals has also been halted. Thus, the production of methyl chloroform (1,1,1-trichloroethane, CH3CCl3), which like CFC-113 has been widely employed as a foam blowing agent, was also ended at the end of 1995 in industrialized countries.

Replacements and Proposed Replacements for Ozone Depleting Chemicals

Among the earliest replacement chemicals proposed as replacements for CFCs and methyl chloroform were the hydrochlorofluorocarbons (HCFCs). These compounds contain hydrogen in addition to carbon, fluorine, and chlorine. The hydrogen atoms in the HCFCs react with hydroxyl free radicals, which are normal constituents of the earth's atmosphere, and, therefore, decrease the atmospheric lifetime of HCFCs relative to CFCs. This decrease in atmospheric lifetime limits the amounts of HCFCs that reach the stratosphere to deplete ozone.

HCFC-123 (2,2-dichloro-1,1,1-trifluoroethane, $CHCl_2CF_3$), HCFC-141b (1,1-dichloro-1-fluoroethane, $CH_3CCl_2F$) and HCFC-124 (2-chloro-1,1,1,2-tetrafluoroethane, $CHClFCF_3$) have been used or are planned for use as foam blowing agents to replace CFCs and methyl chloroform. Unfortunately, the atmospheric destruction process for HCFCs is insufficiently efficient to prevent all of the chemicals from reaching the stratosphere.

Thus, HCFCs exhibit a low, but significant, ODP. For that reason, HCFCs are scheduled for eventual phaseout under the amended Montreal Protocol.

Much research has gone on to find replacements for the CFCs, HCFCs, and methyl chloroform. Hydrofluorocarbons (HFCs), which contain only hydrogen, fluorine, and carbon, and perfluorocarbons (PFCs or FCs), which contain only fluorine and carbon, are being commercialized as replacement chemicals in a number of applications. Since these materials contain no chlorine, bromine, or iodine (which have been considered to be the cause of significant stratospheric ozone depletion), they have a nominally zero ODP. (Here, I use the word "nominally" since calculations have shown an exceedingly small ODP for some of these materials.) However, HFCs and PFCs have very long atmospheric lifetimes and contribute to global warming. In fact, many PFCs have atmospheric lifetimes of several thousand years, compared with a few years for most HCFCs and a few hundred years for most CFCs. Moreover, a number of HFCs and HCFCs are flammable.

Many non-halocarbons are being commercialized or seriously considered as CFC replacements. The hydrocarbon cyclopentane ($C_5H_{10}$) is now used to blow refrigerator insulating foams in some parts of the world, and hydrocarbons such as n-pentane ($CH_3CH_2CH_2CH_2CH_3$), isopentane [$(CH_3)_2CHCH_2CH_3$], n-butane ($CH_3CH_2CH_2CH_3$), and isobutane have long been used in the production of extruded polystyrene foam sheet products. However, these hydrocarbons are flammable. Other flammable chemicals being considered or being used as blowing agents are HCFC-141b, HFC-152a, 2-chloropropane ($CH_3CHClCH_3$), and acetone [$CH_3C(O)CH_3$]. Conversion from CFC and methyl chloroform to flammable blowing agents will entail significant capital investment to ensure worker safety. There is also concern about the ability of foams blown with flammable blowing agents to meet code requirements and safety standards. In fact, there has even been some flammability problems with foams blown with CFCs and methyl chloroform and often flame retardants are added to the foam to limit flammability. Such retardants can, however, degrade polymer properties.

Solution to Flammability Problems

Although methyl chloroform and many CFCs, HCFCs, HFCs, etc. are good blowing agents, the foams produced may still have some flammability problems due to the foam itself burning. With the new blowing agents, many of which are flammable, the problem of foam flammability may increase. Often additives are added to the polymers to reduce foam flammability. However, the use of additives as flame retardants has disadvantages. Such additives often have to be used in relatively high concentrations (typically 10 to 40 percent by weight) to be effective, leading to undesirable changes in physical and mechanical properties (Ebdon, J. R., Joseph, P., Hunt, B. J., Price, D., Milnes, G. J., and Gao, F, "Flame Retardance in Styrenic and Acrylic Polymers with Covalently-Bound Phosphorus-Containing Groups," BCC Conference on Flame Retardancy, Stamford Conn., Jun. 2–4, 1997). Moreover, flammable blowing agents cause safety problems during utilization. What I claim here is the use of specialized, tropodegradable blowing agents to (1) decrease the flammability of closed-cell blown foams and (2) decrease safety risks due to flammability during production of both open-cell and closed-cell foams. In the case of flammability reduction for blown closed-cell foams, the flame suppressing agent is released (from the foam) to extinguish the fire. The flammability reduction action of these agents is not due only to their heat absorption (a mechanism which is relatively ineffective), these agents also act chemically to actually suppress flammability. The mode of action is described immediately below.

Bromine- and iodine-containing compounds disrupt the free-radical chain reactions that maintain combustion. This disruption is a highly effective "chemical" mechanism for fire suppression, as opposed to the primarily "physical" mechanisms of cooling and smothering provided by nonflammable components used to obtain many nonflammable refrigerant and other blends. Iodides, though useful in direct fire protection technologies, appear to have too high a toxicity and too low a stability for serious consideration as agents in the specific applications discussed here. Bromine-containing compounds, such as the halon fire extinguishing agents, are also highly effective chemical fire suppressants. However, bromine-containing compounds in the specific chemical forms used today as fire extinguishing agents (primarily bromofluoroalkanes and bromochlorofluoroalkanes) have high ODPs because of their long atmospheric lifetimes, and their production has been banned in industrialized nations. Moreover, production of the one (briefly) commercialized bromine-containing halon replacement $CHBrF_2$ (HBFC-22B1) has now also been banned in industrialized nations under the Montreal Protocol along with all other hydrobromofluorocarbons (HBFCs). In this case, the presence of a hydrogen atom in the molecule (without other features described in the present disclosure) was insufficient to achieve the hoped-for low atmospheric lifetime. In fact, none of the many halon substitute technologies now being commercialized contain bromine due to the concern about their expected high ODP. It should be noted that once they enter the stratosphere, bromine-containing compounds are about 40 times more destructive to stratospheric ozone than are chlorine-containing compounds (Solomon, S., and Albritton, D. L., "Time-Dependent Ozone Depletion Potentials for Short- and Long-Term Forecasts," Nature, Vol. 357, pp. 33–37, May 7, 1992).

The novel aspect of the present invention is the selection of bromine-containing compounds that solve the problem of stratospheric ozone depletion so that they can be used as blowing agents. If chemical features that promote extremely rapid atmospheric removal are incorporated into the compounds, insufficient amounts of the materials will reach the stratosphere to cause significant stratospheric ozone depletion. Thus, the compounds will have exceptionally low ODPs, even though they contain bromine, which is normally a strong ozone depleter. In fact, the resulting short atmospheric lifetimes will also result in low GWPs. Using this concept, I have (1) examined mechanisms for removal of compounds from the atmosphere, (2) determined chemical features that could enhance the various removal processes, and (3) carried out calculations to estimate the atmospheric lifetimes. This three-step process has allowed me to invent several families of bromine-containing halocarbons that have very short atmospheric lifetimes. Moreover, my calculations and estimation methods indicated that these compounds had much shorter atmospheric lifetimes than I had expected and that these very short atmospheric lifetimes resulted in very low estimated ODPs. I then discovered that such compounds can be used as agents to blow foams safely and to provide closed-cell foams having reduced flammabilities.

The following seven groups of compounds having short tropospheric lifetimes and correspondingly low ODPs and GWPs, but also having chemical features (specifically, bromine) that promote flame suppression effectiveness for use in foam blowing have been arrived at. These families are the 1. Bromine-Containing Alkenes
2. Bromine-Containing Ethers
3. Bromine-Containing Amines
4. Bromine-Containing Carbonyl Compounds
5. Bromine-Containing Aromatics
6. Bromine-Containing Alcohols
7. Bromine-Containing Non-Fluorinated Alkanes Accordingly, it is the object of the present invention to provide bromine-containing foam blowing agents (1) that act chemically to avoid fire safety problems during production and utilization of foams, (2) that act chemically to reduce the flammability of closed-cell foams, and (3) that are rapidly destroyed or removed by natural processes in the troposphere. I refer to such agents as "tropodegradable." As a result of the rapid degradation in the troposphere or removal from the troposphere, the agents will have very short atmospheric lifetimes, low ozone depletion potentials, and low global warming potentials. My criterion is that the estimated atmospheric lifetime be on the order of days or weeks, giving ODPs and GWPs that approach zero (probably less than 0.02 ODP) for a ground-level release. Note that I do not consider materials such as HCFCs, HFCs, and HBFCs to be "tropodegradable" as defined here, even though such chemicals are partially destroyed in the troposphere. The destruction processes are relatively inefficient compared to those for the agents claimed here, and HCFCs, HFCs, and HBFCs normally have atmospheric lifetimes of years to hundreds of years.

SUMMARY OF THE INVENTION

The present invention provides tropodegradable bromine-containing halocarbons that can be used as foam blowing agents to reduce or eliminate the flammability of closed-cell foams and to decrease flammability problems during the production of both closed-cell and open-cell foams. Examples of polymer foams which can be used with the inventive foam blowing agents include (but are not limited to) polyurethane, polystyrene, polyethylene, polypropylene, polyvinyl chloride, polyisocyanurate, and phenolic foams. The compounds of the present invention have the characteristics of high effectiveness for flammability reduction, but have short atmospheric lifetimes (on the order of days or weeks) resulting in low ODPs and GWPs. These chemicals are of seven classes: (1) bromine-containing alkenes, (2) bromine-containing ethers, (3) bromine-containing amines, (4) bromine-containing carbonyl compounds, (4) bromine-containing aromatics, (6) bromine-containing alcohols, and (7) bromine-containing non-fluorinated alkanes. In general, to reduce hepatotoxicity and flammability, such compounds, with the exception of the bromine-containing alkanes, will be at least partially fluorinated. The compounds may also contain chlorine, but should contain no iodine. To obtain the desired low atmospheric lifetimes, the amines and ethers must contain at least one hydrogen atom attached to a carbon atom adjacent to nitrogen or oxygen. The prediction of atmospheric lifetimes for these agents is described below.

Four primary processes exist for removal of organic molecules from the troposphere: (1) reaction with tropospheric hydroxyl free radicals; (2) photolysis; (3) physical removal; and (4) reaction with tropospheric ozone.

Hydroxyl free radicals (.OH) are found naturally in the earth's troposphere. These free radicals react with atmospheric pollutants or other atmospheric compounds that contain hydrogen atoms within their molecules or that are unsaturated. Unsaturated compounds include compounds containing carbon-carbon double bonds (e.g., C=C) and aromatic compounds such as benzene. HCFCs, HFCs, and HBFCs have hydrogen atoms within their molecules and, therefore, react with tropospheric hydroxyl free radicals. However, this reaction is relatively inefficient for the HCFCs and HFCs, many of which are in use today, and for the HBFCs, whose production has now been banned, giving them relatively long atmospheric lifetimes. I have realized, however, that hydrogen atoms on carbon atoms that are adjacent to oxygen or nitrogen atoms are more susceptible to reaction with tropospheric hydroxyl free radicals than they would otherwise be. Thus amines [compounds containing a nitrogen atom, N, attached to three groups to give the characteristic structure N(R)(R')(R"), where the R, R', and R" groups are organic substituents or hydrogen atoms] and ethers (compounds containing an oxygen atom, O, attached to two organic groups R and R' to give the characteristic structure R—O—R') react relatively quickly with tropospheric hydroxyl free radicals as long as the molecules containing one or more hydrogen atoms attached to carbon atoms adjacent to the nitrogen or oxygen atoms. My recent work indicates that this may be true even when the hydrogen atoms occupy other positions in amine and ether molecules. I have calculated estimated lifetimes of less than one year for many hydrofluoroamines (HFAs) and hydrofluoroethers (HFEs). Moreover, I estimate that the replacement of a fluorine atom with a bromine atom in these materials will decrease the lifetime by approximately a factor of ten due, at least in part, to enhanced photolysis (see below). Using this reasoning, I have estimated atmospheric lifetimes as short as 11 days for some hydrobromofluoroamines (HBFAs) and hydrobromofluoroethers (HBFEs). Using a limited amount of data, I estimate that for bromine-containing compounds, each 10 years increase in atmospheric lifetime increases the ODP by approximately 2. Thus, I estimate a minimum ODP of around 0.006 for some HBFAs and HBFEs. I also note that nonfluorinated amines and ethers, though of slightly less interest, would have even shorter atmospheric lifetimes and lower ODPs. Estimations using the same type of calculations show that alcohols [compounds containing the structural feature HOC(R)(R') (R"), where the R, R', and R" groups are organic substituents or hydrogen atoms] also react rapidly with hydroxyl free radicals when they contain a hydrogen atom on a carbon atom adjacent to the OH group characteristic of alcohols. However, a more important atmospheric removal process (rainout, see below) appears to exist for alcohols.

I have also calculated that many non-fluorine-containing bromoalkanes will have very short atmospheric lifetimes due to reaction with tropospheric hydroxyl free radicals. For example, using published rate constants for reaction of hydroxyl free radicals with related compounds and reasoning similar to that described above, I estimate an atmospheric lifetime of approximately four weeks and an ODP of 0.017 for 1-bromopropane ($CH_2BrCH_2CH_3$). Of some interest is that these values should decrease as the carbon chain length increases. Thus, the ODP and atmospheric lifetime of, for example, 1-bromobutane ($CH_2BrCH_2CH_2CH_3$), should be even shorter.

Unsaturated compounds such as alkenes [compounds containing the structural feature (R)(R')C=C(R")(R'"), where the R, R', R", and R'". groups are organic substituents, chlorine, bromine, fluorine, or hydrogen atoms] and aromatics (compounds containing a benzene, $C_6$, ring or related structural features) also react very rapidly with tropospheric hydroxyl free radicals. I estimate lifetimes on the order of a few days for these types of compounds with correspondingly low ODPs for bromine-containing derivatives.

Some compounds are broken down by sunlight in a process known as photolysis, and my estimations show that this is likely to be an effective tropospheric removal process for carbonyl compounds [compounds containing a group (R)(R')C=O, where R and R' are any substituents). Such carbonyl compounds include aldehydes [(R)(H)C=O, where R is an alkyl or aryl group], ketones [(R)(R')C=O, where R and R' are alkyl or aryl groups], and esters [(RO)(R')C=O, where R and R' are alkyl or aryl groups]. Carbonyl compounds are also subject to removal by rainout, as described below.

Rainout is an important physical removal process in the troposphere. Rain can remove water-soluble materials from the atmosphere. This is a highly effective process for very polar materials, and is likely to be a very important removal process for alcohols. It may also be an effective removal process for some carbonyl compounds.

Finally, ozone ($O_3$) appears both in the troposphere (where it is an undesirable pollutant) and in the stratosphere (where it is desirable and protects the earth from ultraviolet radiation from the sun). Tropospheric ozone reacts rapidly with alkenes and provides a highly effective removal process for these compounds, making their atmospheric lifetimes even shorter than would be predicted only from consideration of their reaction with hydroxyl free radicals.

Thus, alkenes react rapidly with hydroxyl free radicals and ozone in the troposphere and therefore degrade before significant quantities can reach the stratosphere, where any bromine present can react with stratospheric ozone. The presence of the hydroxyl group in alcohols enhances reactions of hydrogen atoms present in the molecule with tropospheric hydroxyl free radicals. Alcohols are also expected to be removed rapidly from the atmosphere by rainout. Ethers and amines react rapidly with tropospheric hydroxyl free radicals, particularly when there are one or more hydrogen atoms attached to carbon atoms immediately adjacent to the oxygen or nitrogen atoms. Nonfluorinated bromoalkanes, with more than two carbon atoms, and aromatic compounds also react rapidly with hydroxyl free radicals. Carbonyl compounds are photolyzed by sunlight in the troposphere and, moreover, are subject to rainout. It should be noted, that the present invention, includes chemical compounds that contain combinations of chemical features promoting atmospheric removal. For example, I define carbonyl compounds as any compound containing a carbonyl group even though other atmospheric removal promoting groups (e.g., C=C, hydroxyl groups, etc.) may be present.

These and other aspects of the present invention will be more apparent upon consideration of the following detailed description of the invention.

DESCRIPTION OF PREFERRED EMBODIMENTS

Whereas many compounds desirable as foam blowing agents are known to be flammable and whereas even with the common nonflammable blowing agents, blown foams may be sufficiently flammable to give safety concerns, one or more of the compounds of the present invention can be used to blow foams to give closed-cell foam products with reduced flammabilities and to avoid safety concerns during production of both closed-cell and open-cell foams. Of major importance, however, is that these agents have low estimated atmospheric lifetimes (on the order of days or weeks) while containing chemical features that give a good efficiency for reduction of flammability. The short atmospheric lifetimes for the agents lead to low (near zero) stratospheric ozone depletion potentials and low (near zero) global warming potentials. Families of compounds with these characteristics are (1) bromine-containing alkenes, (2) bromine-containing ethers with at least one hydrogen atom (preferably attached to a carbon atom adjacent to the oxygen atom), (3) bromine-containing amines with at least one hydrogen atom (preferably attached to a carbon atom adjacent to the nitrogen atom), (4) bromine-containing carbonyl compounds, (5) bromine-containing aromatics, (6) bromine-containing alcohols, and (7) bromine-containing non-fluorinated alkanes.

The compounds of the present invention include the following compounds, none of which contain iodine:

1. Bromine-containing alkenes having one or more double bonds, one or more bromine atoms, and preferably two to six carbon atoms, with the remaining atoms preferably being hydrogen, chlorine, and/or fluorine. Examples include (but are not limited to) 1-bromo-1,1-difluoro-2-propene ($CH_2$=$CHCF_2Br$); 2-bromo-1,1,1-trifluoro-2-propene ($CH_2$=$CBrCF_3$); 1-bromo-3,3,3-trifluoro-1-propene ($BrCH$=$CHCF_3$); 3-bromo-1,1,3,3-tetrafluoro-1-propene ($CF_2$=$CHCF_2Br$); 2,3-dibromo-3,3-difluoro-1-propene ($CH_2$=$CBrCBrF_2$); 1,2-dibromo-3,3,3-trifluoro-1-propene ($BrCH$=$CBrCF_3$); 4-bromo-3,3,4,4-tetrafluoro-1-butene ($CH_2$=$CHCF_2CF_2Br$); 4-bromo-3-chloro-3,4,4-trifluoro-1-butene ($CH_2$=$CHCClFCF_2Br$); 4-bromo-3,4,4-trifluoro-3-trifluoromethyl-1-butene [$CH_2$=$CHCF(CF_3)CBrF_2$]; and 2-bromo-1,1,1-trifluoro-2-propene ($CF_3CHBr$=$CH_2$).

2. Bromine-containing ethers containing one or more bromine atoms and preferably two to six carbon atoms, and preferably with at least one hydrogen atom (preferably attached to a carbon atom adjacent to the oxygen atom), and with the remaining atoms preferably being hydrogen, chlorine, and/or fluorine. Examples include (but are not limited to) (difluoromethyl)(bromofluoromethyl)ether ($CF_2$—H—O—$CFHBr$) and (2,2,2-trifluoroethyl)(2-bromo-2,2-difluoroethyl)ether ($CF_3CH_2$—O—$CH_2CF_2Br$).

3. Bromine-containing amines containing one or more bromine atoms and preferably three to twelve carbon atoms, and preferably with at least one hydrogen atom (preferably attached to a carbon atom adjacent to the nitrogen atom), and with the remaining atoms preferably being hydrogen, chlorine, and/or fluorine. Examples include (but are not limited to) (bromodifluoromethyl)bis(difluoromethyl)amine [$(CBrF_2)(CHF_2)_2N$] and (bromodifluoromethyl)(trifluoromethyl)methylamine [$(CBrF_2)(CF_3)(CH_3)N$].

4. Bromine-containing carbonyl compounds, including preferably bromine-containing esters, bromine-containing ketones, and bromine-containing aldehydes, and containing one or more bromine atoms, and preferably two to eight carbon atoms, with the remaining atoms preferably being hydrogen, chlorine, and/or fluorine. Examples include (but are not limited to) such as methyl 2-bromo-2,2-difluoroacetate ($CF_2BrCH_2COOCH_3$), 1-bromo-1,1-difluoro-3-butanone [$CF_2BrCH_2C(O)CH_3$], and 1-bromo-1,1-difluoro-3-propanaldehyde [$CF_2BrCH_2C(O)H$].

5. Bromine-containing aromatics, containing one or more bromine atoms and preferably six to twelve carbon atoms, with the remaining atoms preferably being hydrogen, chlorine, and/or fluorine. Examples include (but are not limited to) bromopentafluorobenzene ($C_6F_5Br$), (bromodifluoromethyl)pentafluorobenzene ($C_6F_5CBrF_2$), and the 2-bromo, 3-bromo, and 4-bromo isomers of bromoheptafluorotoluene ($C_6BrF_4CF_3$).

6. Bromine-containing alcohols having one or more hydroxyl groups, one or more bromine atoms, and preferably one to six carbon atoms, with the remaining atoms preferably being hydrogen, chlorine, and/or fluorine. Examples include (but are not limited to) 1-bromo-1,1-difluoro-2-ethanol ($CF_2BrCH_2OH$) and 1-bromo-1,2-difluoro-1,2-ethanediol (CHFOHCFBrOH).

7. Bromine-containing alkanes containing no fluorine atoms, one or more bromine atoms, and preferably two to six carbon atoms, with the remaining atoms preferably being hydrogen, chlorine, and/or fluorine. Examples include (but are not limited to) bromoethane ($CH_3CH_2Br$), 1-bromopropane ($CH_2BrCH_2CH_3$), 2-bromopropane ($CH_3CHBrCH_3$), 1-bromobutane ($CH_2BrCH_2CH_2CH_3$), 2-bromobutane ($CH_3CHBrCH_2CH_3$), 1-bromo-2-methylpropane [$CH_2BrCH(CH_3)CH_3$], and 1-bromo-2-chloroethane ($CH_2BrCH_2Cl$). It is important that hydrogen atoms be present in these compounds.

The present invention has been described and illustrated with reference to certain preferred embodiments. Nevertheless, it will be understood that various modifications, alterations and substitutions may be apparent to one of ordinary skill in the art, and that such modifications, alterations and substitutions may be made without departing from the essential invention. Accordingly, the present invention is defined only by the following claims.

What is claimed is:

1. A method of reducing or eliminating the flammability of closed-cell polymer foams, said method comprising the steps of:
    a) providing a foam blowing agent comprising at least one compound selected from the group consisting of bromine-containing alkenes, bromine-containing ethers, bromine-containing amines, bromine-containing carbonyl compounds, and bromine-containing aromatics, and
    b) expanding polymer foam substituents with said foam blowing agent.

2. A polymer foam blowing agent comprising at least one compound selected from the group consisting of bromine-containing alkenes, bromine-containing ethers, bromine-containing amines, bromine-containing carbonyl compounds, and bromine-containing aromatics.

3. A polymer foam produced using a foam blowing agent comprising at least one compound selected from the group consisting of bromine-containing alkenes, bromine-containing amines, bromine-containing ethers, bromine-containing carbonyl compounds, and bromine-containing aromatics.

4. A method of reducing or eliminating flammability safety concerns during the production of both open-cell and closed-cell polymer foams, said method comprising the steps of:
    a) providing a foam blowing agent comprising at least one compound selected from the group consisting of bromine-containing alkenes, bromine-containing ethers, bromine-containing amines, bromine-containing carbonyl compounds, and bromine-containing aromatics, and
    b) expanding polymer foam substituents with said foam blowing agent.

5. A method of reducing or eliminating the flammability of closed-cell polymer foams, said method comprising the steps of:
    a) providing a foam blowing agent comprising at least one compound selected from the group consisting of bromine-containing alkenes, bromine-containing ethers, bromine-containing amines, bromine-containing carbonyl compounds, bromine-containing aromatics, wherein said foam blowing agent contains no iodine, and
    b) expanding polymer foam substituents with said foam blowing agent, wherein foam blowing agent is disposed in the closed cells of said foam after expansion to provide said reduction or elimination of flammability.

6. A closed-cell polymer foam produced using a foam blowing agent comprising at least one compound selected from the group consisting of bromine-containing alkenes, bromine-containing amines, bromine-containing ethers, bromine-containing carbonyl compounds, bromine-containing aromatics, bromine-containing alcohols, and bromine-containing non-fluorinated alkanes, wherein said foam blowing agent contains no iodine, and wherein foam blowing agent is disposed in the closed cells of said foam after expansion of polymer foam substituents with said agent.

* * * * *